United States Patent
Galpin et al.

(10) Patent No.: US 12,231,643 B2
(45) Date of Patent: Feb. 18, 2025

(54) METHOD AND APPARATUS FOR VIDEO ENCODING AND DECODING WITH MATRIX BASED INTRA-PREDICTION

(71) Applicant: InterDigital Madison Patent Holdings, SAS, Paris (FR)

(72) Inventors: Franck Galpin, Thorigne-Fouillard (FR); Fabien Racape, San Francisco, CA (US); Jean Begaint, Menlo Park, CA (US); Swayambhoo Jain, Milpitas, CA (US); Shahab Hamidi-Rad, Sunnyvale, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 496 days.

(21) Appl. No.: 17/627,377

(22) PCT Filed: Jul. 1, 2020

(86) PCT No.: PCT/US2020/040471
§ 371 (c)(1),
(2) Date: Jan. 14, 2022

(87) PCT Pub. No.: WO2021/015935
PCT Pub. Date: Jan. 28, 2021

(65) Prior Publication Data
US 2022/0256161 A1    Aug. 11, 2022

(30) Foreign Application Priority Data

Jul. 22, 2019    (EP) .................................... 19305969

(51) Int. Cl.
*H04N 19/132*    (2014.01)
*H04N 19/105*    (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11); *H04N 19/70* (2014.11)

(58) Field of Classification Search
CPC .... H04N 19/176; H04N 19/70; H04N 19/159; H04N 19/593; H04N 19/132;
(Continued)

(56) References Cited

U.S. PATENT DOCUMENTS

2014/0252857 A1    9/2014    Wu et al.
2014/0269939 A1    9/2014    Guo et al.
(Continued)

FOREIGN PATENT DOCUMENTS

CN    108141608 A    6/2018
CN    108988988 A    12/2018
(Continued)

OTHER PUBLICATIONS

Jonathan et al. ("CE3: Affine linear weighted intra prediction (CE3-4.1, CE3-4.2)", Joint Video Experts Team (JVET) of ITU-T SG 16 WP 3 and ISO/IEC JTC 1/SC 29/WG 11, Published 14th Meeting: Geneva, CH, Mar. 19-27, 2019) (Year: 2019).*
(Continued)

*Primary Examiner* — Masum Billah
(74) *Attorney, Agent, or Firm* — Condo Roccia Koptiw LLP

(57) ABSTRACT

Different implementations are described, particularly implementations for video encoding and decoding based on linear weighted intra prediction, also called matrix based intra prediction, are presented. Accordingly, for a block being encoded or decoded in linear weighted intra prediction, obtaining intra predicted samples from at least two matrix-vector products between at least two selected weight matrices of reduced size and a set of neighboring reference
(Continued)

samples. Advantageously, such arrangement allows to reduce the amount of memory for storing data and to reduce the complexity of the intra prediction samples computation.

22 Claims, 6 Drawing Sheets

(51) Int. Cl.
  *H04N 19/159* (2014.01)
  *H04N 19/176* (2014.01)
  *H04N 19/70* (2014.01)
(58) Field of Classification Search
  CPC .... H04N 19/11; H04N 19/105; H04N 19/186; H04N 19/18; H04N 19/42; H04N 19/463; H04N 19/59
  USPC ......................................................... 375/240
  See application file for complete search history.

(56) References Cited

U.S. PATENT DOCUMENTS

| 2016/0087834 A1 | 3/2016 | Zhao et al. |
| 2017/0094285 A1 | 3/2017 | Said et al. |

FOREIGN PATENT DOCUMENTS

| EP | 3484151 A1 | 5/2019 |
| WO | 2018/219925 A1 | 12/2018 |

OTHER PUBLICATIONS

Fabien et al. ("Report on CE2 results from Interdigital", International Organisation for Standardisation Organisation Internationale De Normalisation ISO/IEC JTC1/SC29/WG11 Coding of Moving Pictures and Audio, published on Jul. 2019, Gothenburg, Sweden) (Year: 2019).*

Benjamin et al. ("Versatile Video Coding (Draft 5)", Joint Video Experts Team (JVET) of ITU-T SG 16 WP 3 and ISO/IEC JTC 1/SC 29/WG 11, published on 14th Meeting: Geneva, CH, Mar. 19-27, 2019) (Year: 2019).*

Bross et al., "Versatile Video Coding (Draft 5)", Joint Video Experts Team (JVET) of ITU-T SG 16 WP 3 and ISO/IEC JTC 1/SC 29/WG 11, Document: JVET-N1001-v8, 14th Meeting, Geneva, Switzerland, Mar. 19, 2019, 397 pages.

Pan, et al., "Inversion of Displacement Operators", Society for Industrial and Applied Mathematics (SIAM), Journal on Matrix Analysis and Applications, vol. 24, No. 3, 2003, 18 pages.

Bross et al., "Versatile Video Coding (Draft 5)", Joint Video Experts Team (JVET) of ITU-T SG 16 WP 3 and ISO/IEC JTC 1/SC 29/WG 11, Document: JVET-N1001-v10, 14th Meeting, Geneva, Switzerland, Mar. 19, 2019, 84 pages.

Racape et al., "Report on CE2 results from Interdigital", International Organization for Standardization, ISO/IEC JTC1/SC29/WG11—Coding of Moving Pictures and Audio, Document: MPEG2019/m49258, Gothenburg, Sweden, Jul. 2019, 4 pages.

Anonymous, "Reference software for ITU-T H.265 high efficiency video coding", International Telecommunication Union, Series H: Audiovisual and Multimedia Systems Infrastructure of audiovisual services—Coding of moving video, Recommendation ITU-T H.265.2, Oct. 2014, 12 pages.

Wang et al., "A Low-rank Matrix Completion Based Intra Prediction for H.264/AVC", 2011 IEEE 13th International Workshop on Multimedia Signal Processing, Oct. 17, 2011, Hangzhou, China, 6 pages.

Albrecht et al., "Description of SDR, HDR, and 360° video coding technology proposal by Fraunhofer HHI", Joint Video Experts Team (JVET) of ITU-T SG 16 WP 3 and ISO/IEC JTC 1/SC 29/WG 11, Document: JVET-J0014-v4, 10th Meeting: San Diego, USA, Apr. 10, 2018, 122 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

Anonymous, "Series H: Audiovisual and Multimedia Systems, Infrastructure of audiovisual services—Coding of moving video—Information Technology—Generic coding of moving pictures and associated audio information: Video". International Telecommunication Union, ITU-T Telecommunication Standardization Sector of ITU, Recommendation ITU-T H.262, Feb. 2000, 220 pages.

Pfaff et al., "CE3: Affine linear weighted intra prediction (CE3-4.1, CE3-4.2)", Joint Video Exploration Team (JVET) of ITU-T SG 16 WP 3 and ISO/IEC JTC 1/SC 29/WG 11, Document: JVET-N0217, 14th Meeting, Geneva, Switzerland, Mar. 19, 2019, 17 pages.

Kondo et al., "Non-CE3: On rounding shift of MIP", Joint Video Experts Team (JVET) of ITU-T SG 16 WP 3 and ISO/IEC JTC 1/SC 29/WG 11, Document: JVET-O0408-v2, 15th Meeting, Gothenburg, Sweden, Jul. 3, 2019, 4 pages.

\* cited by examiner

SPLIT_BT_VER     SPLIT_BT_HOR     SPLIT_TT_VER     SPLIT_TT_HOR

METHOD AND APPARATUS FOR VIDEO ENCODING AND DECODING WITH MATRIX BASED INTRA-PREDICTION

CROSS REFERENCE TO RELATED APPLICATIONS

This application is a U.S. National Stage Application under 35 U.S.C. 371 of International Patent Application No. PCT/US2020/040471, filed Jul. 1, 2020, which is incorporated herein by reference in its entirety.

This application claims the benefit of European Patent Application No. 19305969, filed Jul. 22, 2019, which is incorporated herein by reference in its entirety.

TECHNICAL FIELD

At least one of the present embodiments generally relates to, e.g., a method or an apparatus for video encoding or decoding, and more particularly, to a method or an apparatus comprising obtaining intra predicted samples of a block from at least two matrix-vector products between at least two weight matrices and a set of neighboring reference samples.

BACKGROUND

The domain technical field of the one or more implementations is generally related to video compression. At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), or compared to under development video compression systems such as VVC (Versatile Video Coding, a new standard being developed by JVET, the Joint Video Experts Team).

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology includes intra prediction using a combination of down-sampling of reference samples and matrix products. A disadvantage of such intra prediction is the huge amount of data needed for storing the weighting parameters used in the various filtering process. It is thus desirable to optimize the storage of intra prediction matrices for memory efficiency and to optimize the calculations of intra predicted samples at the decoding for complexity.

SUMMARY

The purpose of the invention is to overcome at least one of the disadvantages of the prior art. For this purpose, according to a general aspect of at least one embodiment, a method for video encoding is presented, comprising encoding a block of a picture of the video in intra prediction mode using linear weighted prediction. According to a particular characteristic, the encoding comprises obtaining intra predicted samples of the block from at least two matrix-vector products between at least two selected weight matrices and associated bias vector among a set of weight matrices and associated bias vectors and a set of neighboring reference samples.

Advantageously, the at least two selected weight matrices are structured to involve less multiplications per samples to be predicted, as well as less coefficients to be stored in memory. The low inference complexity thereby enables the power of matrix based intra-prediction in resource limited devices where decoders are often implemented.

According to another general aspect of at least one embodiment, a method for video decoding is presented, comprising decoding a block of a picture of the video, the block being coded in intra prediction mode using linear weighted prediction. As for the encoding method, according to a particular characteristic the decoding further comprises obtaining intra predicted samples of the block from at least two matrix-vector products between at least two selected weight matrices and associated bias among a set of weight matrices and associated bias vectors and a set of neighboring reference samples.

According to another general aspect of at least one embodiment, an apparatus for video encoding is presented comprising means for implementing any one of the embodiments of the encoding method.

According to another general aspect of at least one embodiment, an apparatus for video decoding is presented comprising means for implementing any one of the embodiments of the decoding method.

According to another general aspect of at least one embodiment, an apparatus for video encoding is provided, comprising one or more processors, and at least one memory. The one or more processors is configured to implement to any one of the embodiments of the encoding method.

According to another general aspect of at least one embodiment, an apparatus for video decoding is provided, comprising one or more processors and at least one memory. The one or more processors is configured to implement to any one of the embodiments of the decoding method.

According to another general aspect of at least one embodiment, the encoding or decoding of a block using linear weighted prediction further comprises determining a set of n neighboring reference samples x; selecting at least two weight matrices G and $H^T$ of size m×r and r×n and associated bias vector b among a set of weight matrices and associated bias vectors based on a mode of linear weighted intra prediction and a block shape, the first selected weight matrix G having a size m×r and the second selected weight matrix G having a size r×n, where m, n, r are integers with r smaller than m and r smaller than n; and obtaining intra predicted samples f of the block from a first product of matrices $H^T x$, a second product of matrices $G(H^T x)$ and adding associated bias b resulting in $\hat{y}=G(H^T x)+b$.

According to another general aspect of at least one embodiment, the first and second weight matrices G and $H^T$ are obtained from low rank processing of a weight matrix M of size m×n and wherein an estimate $\hat{M}$ of the weight matrix M is the product of the first and second weight matrices G and $H^T$, $\hat{M}=GH^T$.

According to another general aspect of at least one embodiment, r is determined to reduce matrices product complexity.

According to another general aspect of at least one embodiment, wherein r is determined responsive to Single Value Decomposition SVD of the weight matrix M.

According to another general aspect of at least one embodiment, for a block of size width*height, the set of neighboring reference samples x comprises all the reconstructed samples from a neighboring top line of size width and from a neighboring left line of size height.

According to another general aspect of at least one embodiment, for a block of size width*height, the set of neighboring reference samples x comprises all the reconstructed samples from a neighboring top line of size 2*width and from a neighboring left line of size 2*height.

According to another general aspect of at least one embodiment, at least one high level syntax element representative of the set of weight matrix and associated bias is signaled in the Picture Parameter Set (PPS) so that all blocks in a frame using linear weighted prediction uses the signaled set of weight matrices. According to another general aspect of at least one embodiment, at least one high level syntax element representative of the set of weight matrix and associated bias is signaled in the Sequence Parameter Set (SPS) so that all blocks in a sequence using linear weighted prediction uses the signaled set of weight matrices.

According to another general aspect of at least one embodiment, the bit depth of the two matrix-vector products of matrices is increased with regard to the bit depth of intra predicted samples.

According to another general aspect of at least one embodiment, a non-transitory computer readable medium is presented containing data content generated according to the method or the apparatus of any of the preceding descriptions.

According to another general aspect of at least one embodiment, a signal is provided comprising video data generated according to the method or the apparatus of any of the preceding descriptions.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of a picture. They may be applied to encode/decode a part of picture, such as a slice or a tile, or a whole sequence of pictures.

Various methods are described above, and each of the methods comprises one or more steps or actions for achieving the described method. Unless a specific order of steps or actions is required for proper operation of the method, the order and/or use of specific steps and/or actions may be modified or combined.

At least one embodiment efficiently combines the matrix based intra prediction tool adopted in VVC and matrix structural decompositions to both reduce the memory footprint of those matrices and facilitate the computations at the decoder side. According to one non limiting example, the matrix structural decompositions comprise matrix factorizations such as Low Rank and Low Displacement Rank representations of weight matrices.

In section 1, some limitations regarding the matrix based intra prediction are disclosed.

In section 2, several embodiments of a method for encoding or decoding using linear weighted intra prediction are disclosed.

In section 3, additional information and generic embodiments implementing the disclosed method are disclosed.

1 Intra Prediction: Principles and Limitations

In HEVC coding, a picture is partitioned into CTUs of square shape with a configurable size typically 64×64. The size may be 128×128, or 256×256 in other video coding standards. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

Figure 1:
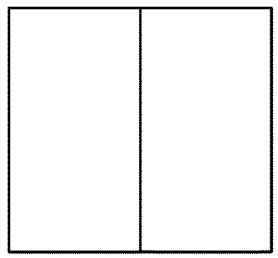
FIG. 1 depicts examples of binary and triple tree split modes.
Figure 1:
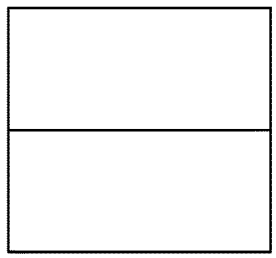
Figure 1:
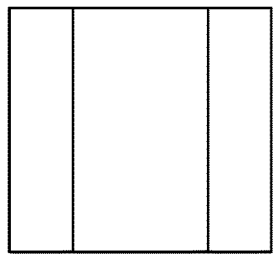
Figure 1:
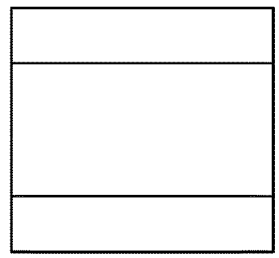
Figure 2:
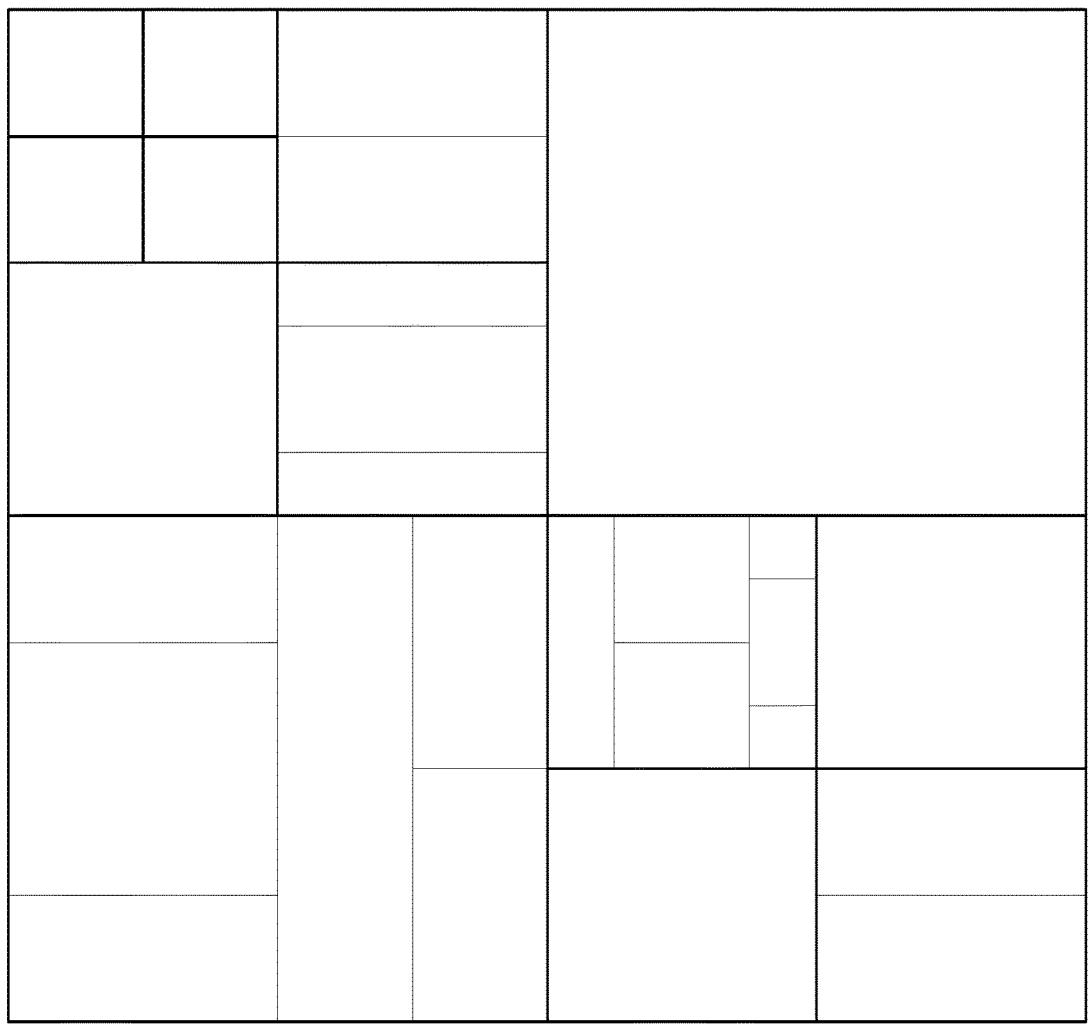
FIG. 2 depicts a Coding Tree Block (CTB) split into Coding Blocks (CBs) according to various split modes, e.g. binary and triple tree split modes.

In more recent encoding systems, a CTU is the root of a coding tree partitioning into Coding Units (CU). A coding tree is a tree in which a parent node (usually corresponding to a block) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. FIG. 1 depicts examples of such split modes. The two split modes on the left are classical binary split mode that split a block into two identical sub-blocks either vertically (SPLIT_BT_VER) or horizontally (SPLIT_BT_HOR). The two split modes on the right are examples of triple tree split modes. The SPLIT_TT_VER mode splits a block into three sub-blocks vertically of respective widths N/4, N/2 and N/4. The SPLIT_TT_HOR mode splits a block into three sub-blocks horizontally of respective heights N/4, N/2 and N/4. The coding tree has a unique root node, e.g. a CTU. A leaf of the coding tree is a terminating node of the tree. Each node of the coding tree represents a block that may be further split into smaller blocks also named sub-blocks or more generally sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure. FIG. 2 depicts a CTU split into CUs according to various split modes. More precisely, it represents a coding tree of a CU with nested Quad Tree (QT), Binary Tree (BT) and Triple Tree (TT) structures.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Intra prediction in video compression refers to the spatial prediction of a block of pixels using the information from the causal neighbor blocks, that is, the neighboring blocks in the same frame which have already been decoded. This is a powerful coding tool since it allows for high compression efficiency in INTRA frames, as well as in INTER frames whenever there is no better temporal prediction. Therefore, intra prediction has been included as a core coding tool in all video compression standards including H.264/AVC, HEVC, etc.

Intra prediction exploits the spatial correlation among the pixels which may belong to the same object, background or region, etc. In this context, the intra prediction in video coding standards such as H.264/AVC, H.265/HEVC, etc., has been designed to capture directionalities of object orientations and the slow changing intensity of regions or textures. In HEVC, for example, the intra prediction includes 35 prediction modes which include one DC, one PLANAR, and 33 angular prediction modes. The angular modes are designed to model the directional structures of objects whereas the DC and the planar modes provide predictions for regions with slow and gradual intensity change, and also for regions with varying textures. In the Versatile Video Coding Test Model (VTM), which aims at designing the future standard H.266, the number of prediction modes has been increased to 67 to accommodate further directions especially useful for big block sizes. In the case of directional prediction modes, the filtered pixel values from neighboring left and top neighbors are repeated in predefined directions. To smooth the prediction along block boundaries, Position Dependent intra Prediction Combination (PDPC) has been introduced. It aims at smoothing the prediction at the target block boundary using an additional reference sample. For some prediction directions, some of the reference samples are not available, and hence padding of references samples is used.

In HEVC, encoding of a frame of video sequence is based on a quad-tree (QT) block structure. A frame is divided into square coding tree units (CTUs) which all undergo quad-tree based splitting to multiple coding units (CUs) based on rate-distortion criteria. Each CU contains at least one prediction unit (PU), which are the basis blocks for prediction tools. In Intra prediction, a PU is spatially predicted from the causal neighbor PUs, i.e., the PUs on the top and the left. For that purpose, HEVC uses simple spatial models called prediction modes. Based on the decoded pixel values in the top and left PUs, called reference pixels, the encoder constructs different predictions for the target block and chooses the one that leads to the best RD performance. Out of the 35 defined modes, one is a planar mode (indexed as mode 0), one is a DC mode (indexed as mode 1) and the remaining 33 (indexed as mode 2-34) are angular modes. The angular modes aim to model the directional structures of objects in a frame. Therefore, the decoded pixel values in the top and left CUs are simply repeated along the defined directions to fill up the prediction block. Since this process can lead to discontinuities along the top and left reference boundaries for certain modes, those prediction modes include a subsequent post-filtering to smooth the pixel values along those boundaries.

The above prediction models work very well as long as the intensity values do not change too much. However, in natural imagery, the intensity values on objects often undergo changes due to several reasons. Either as a color property of the object itself, or because of lighting, depth, motion, etc., the intensity values over a PU can undergo changes which cannot be sufficiently modelled using pixel repetition. This is especially true when the PU size is large. In VTM, it has been proposed to use CTU sizes up to 128. Therefore, it is more meaningful to consider other prediction models such as interpolation which will model the intensity change much more efficiently.

Intra Prediction in HEVC

Figure 3:
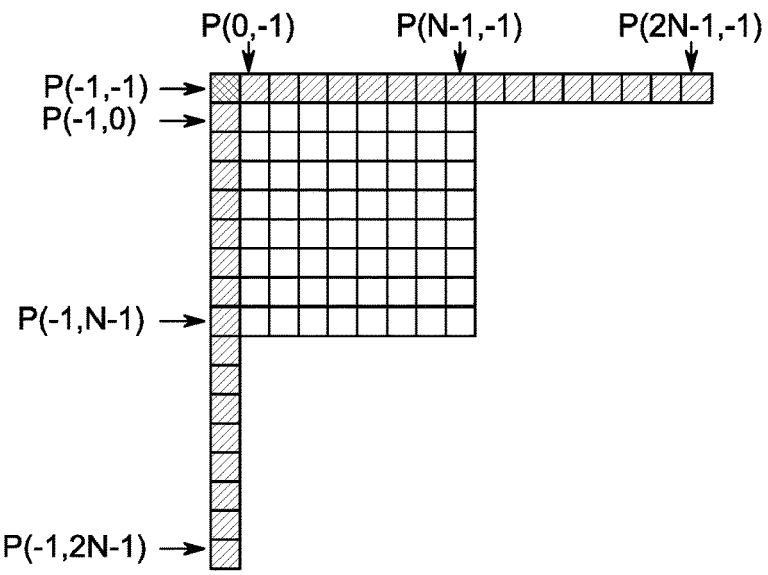
FIG. 3 illustrates the sample reference generation process from neighboring reference samples.

The intra prediction process in HEVC comprises three steps: (1) reference sample generation (2) intra sample prediction and (3) post-processing of predicted samples. The reference sample generation process is illustrated in FIG. 3. For a PU of size N×N, a row of 2N decoded samples on the top is formed from the previously reconstructed top and top right pixels to the current PU. Similarly, a column of 2N samples on the left is formed from the reconstructed left and below left pixels. The corner pixel at the top-left position is also used to fill up the gap between the top row and the left column references. If some of the samples on top or left are not available, e.g. because of the corresponding CUs not being in the same slice, or the current CU being at a frame boundary, then a method called reference sample substitution is performed where the missing samples are copied from the available samples in a clock-wise direction. Then, depending on the current CU size and the prediction mode, the reference samples are filtered using a specified filter.

The next step, i.e., the intra sample prediction, consists of predicting the pixels of the target CU based on the reference samples. As mentioned before, in order to predict different kinds of content efficiently, HEVC supports a range of prediction models. Planar and DC prediction modes are used to predict smooth and gradually changing regions, whereas angular prediction modes are used to capture different directional structures. HEVC supports 33 directional prediction modes which are indexed from 2 to 34. These prediction modes correspond to different prediction directions as illustrated in FIG. 4.

Figure 4:
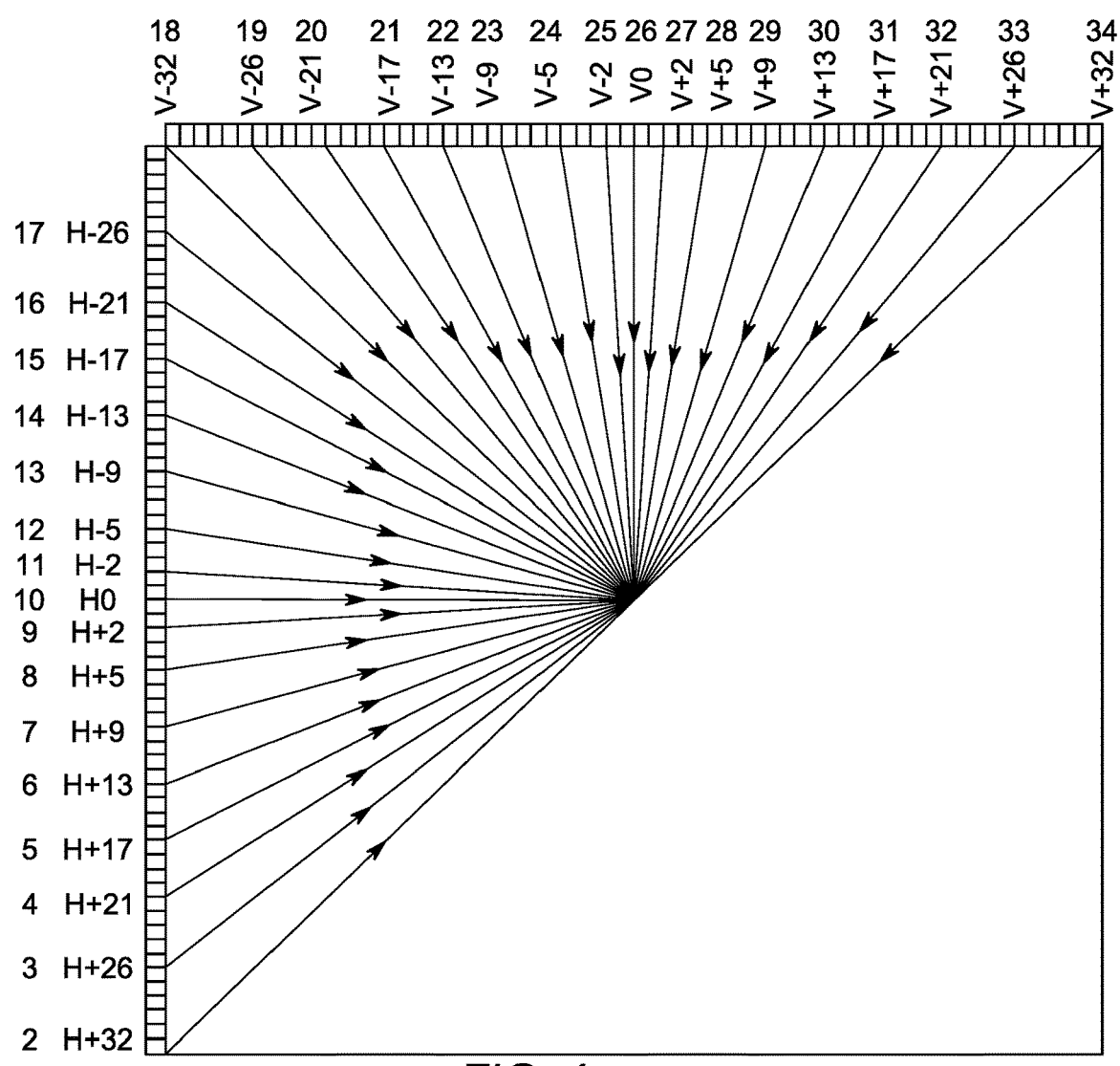
FIG. 4 represents various prediction directions as used in intra prediction.

As shown in FIG. 4, the defined angular directions result in a sample accuracy of $1/32$. That is, between any two adjacent reference samples, there are 32 possible directions. The defined directions can be distinguished as either vertical or horizontal. The predictions in horizontal directions use either only left reference samples or some left and some top reference samples. Similarly, the predictions in vertical directions use either only top reference samples or some top and some left reference samples. The directions which use only left reference samples or only the top reference samples are defined to be positive directions. Thus, we have horizontal positive directions from H0 to H+32 that use only the left reference samples. Similarly, we have vertical positive directions from V0 to V+32 that use only the top reference samples. Other horizontal and vertical directions (H-2 to H-26 and V-2 to V-32) are defined to be negative directions and they use reference samples both on the left and on the top. The table below shows the relationship between the prediction mode and the angle parameter A as specified by HEVC:

$topRef[x]=P[x-1][-1]$, $0 \leq x \leq 2N$, for vertical predictions $leftRef[y]=P[-1][y-1]$, $0 \leq y \leq 2N$, for horizontal predictions where N is the CU size and P[x][y] are the reconstructed samples of the neighboring CUs as depicted on FIG. 3. It is conventional to initialize the sample coordinates to (0,0) at the top-left pixel of the target CU. Therefore, the top reference samples will have their y-coordinate as −1 and the left reference samples will have their x-coordinate as −1.

For the modes with negative angle parameter A (modes 11 to 25), the reference array needs pixels from both the top and left reference. In this case, the reference array will extend to the negative indices beyond 0. Sample values on the reference array with positive indices are obtained as above depending on vertical or horizontal prediction. Those on the reference array with negative indices are obtained by projecting the left (for vertical predictions) or top reference pixels (for horizontal predictions) on the reference array along the prediction direction.

Once the reference array is constructed, the prediction sample value Pred[x][y] at any pixel position (x, y) inside the target CU is obtained by first projecting the pixel position (x, y) to the reference array along the selected direction to obtain the reference array position indices i (integer index) and f (fractional index). The prediction sample value Pred[x][y] is then computed at a sample resolution of ($1/32$) by interpolating between two adjacent reference samples as illustrated below:

$Pred[x][y]=((32-f)*topRef[x+i+1]+f*topRef[x+i+2]+16)>>5)$, $0 \leq x,y < N$, for vertical predictions $Pred[x][y]=((32-f)*leftRef[y+i+1]+f*leftRef[y+i+2]+16)>>5)$, $0 \leq x,y < N$, for horizontal predictions, where i and f denote the integer part and the fractional part of the projected displacement from the pixel location (x,y).

If Δ denotes the projected displacement, then $\Delta=(x+1)*A$, for horizontal predictions, and $\Delta=(y+1)*A$, for vertical predictions.

TABLE 1

Mapping of mode index to angle parameter A

| Horizontal directions | | | | | | | | | | | | | | | | |
|---|---|---|---|---|---|---|---|---|---|---|---|---|---|---|---|---|
| Mode index | 2 | 3 | 4 | 5 | 6 | 7 | 8 | 9 | 10 | 11 | 12 | 13 | 14 | 15 | 16 | 17 |
| A | 32 | 26 | 21 | 17 | 13 | 9 | 5 | 2 | 0 | −2 | −5 | −9 | −13 | −17 | −21 | −26 |
| Vertical directions | | | | | | | | | | | | | | | | |
| Mode index | 18 | 19 | 20 | 21 | 22 | 23 | 24 | 25 | 26 | 27 | 28 | 29 | 30 | 31 | 32 | 33 | 34 |
| A | −32 | −26 | −21 | −17 | −13 | −9 | −5 | −2 | 0 | 2 | 5 | 9 | 13 | 17 | 21 | 26 | 32 |

In HEVC reference software, a reference array is first constructed using the top and left reference samples. For vertical predictions, the reference array is horizontal and for horizontal predictions, the reference array is vertical. For the modes with positive angle parameter A (modes 2 to 10 and 26 to 34), the reference array is simply the top reference sample topRef[ ] or left reference sample leftRef[ ] depending on the direction:

$i=\Delta>>5$, where $>>$ is an arithmetic right shift.

$f=\Delta \& 31$, where & is a bit-wise "and" operator.

In the case where f=0, i.e. there is no fractional part, then the prediction is equal to the reference array sample in the direction of prediction.

As we observe from the above expressions, the vertical predictions are independent of the y-coordinate and the horizontal predictions are independent of the x-coordinate.

This means that, for vertical predictions, the prediction values are repeated along the direction of prediction from the reference array on the top. Similarly, for horizontal predictions, the prediction values are repeated along the direction of prediction from the reference array on the left. Therefore, if two or more pixel's coordinates have the same projection point on the reference array, they have identical prediction values.

VTM Extensions (Versatile Video Coding Test Model) for Intra Prediction

Another prediction method involving learned matrices for intra prediction, described in "CE3: Affine linear weighted intra prediction (CE3-4.1, CE3-4.2)" (JVET-N0217, 14th Meeting: Geneva, CH, 19-27 Mar. 2019) was recently adopted in the reference model for H.266/VVC. This tool is also called Matrix based Intra Prediction (MIP) or linear weighted intra prediction. Several matrices of weights are learnt offline to then be applied at encoder and decoder for mapping the causal reconstructed sample onto a current block to be predicted. One of the matrices is chosen at the encoder side depending on the size and shape of the block and its performance at predicting the block given a rate/distortion criterion on the encoded block.

Like almost all traditional intra prediction tools, for predicting a rectangular block of width W and height H, the affine linear weighted intra prediction (ALWIP) takes one line of H reconstructed neighboring boundary samples left of the block and one line of W reconstructed neighbouring boundary samples above the block as input. Similarly to the regular intra prediction process of HEVC, the affine linear weighted intra prediction has three main steps: (1) reference sample reduction (2), intra sample prediction and (3) interpolation of missing predicted samples.

First, the neighboring reference samples are grouped and averaged, resulting in a vector of 4 values in the case of W=H=4 and 8 values for bigger blocks. Then, the method operates as a fully connected layer of a neural network, where the input is the above vector and the output consists in a vector representing a set of samples, which represent a subsampled set of samples in the block to predict. Finally, the full prediction is generated by interpolating the obtained samples on the subsampled set by linear interpolation.

Three sets $S_0, S_1, S_2$ of matrices and vectors are available for the encoder to select. For blocks of size 4×4, the set $S_0$ contains 18 matrices and bias vectors of size 16×4 and 16 respectively. For blocks of sizes 4×8, 8×4 and 8×8, $S_1$ consists of 10 matrices of size 16×8 and biases of size 16. Finally, for all other block shapes, the set $S_2$ consists of 6 matrices of size 64×8 and 6 bias vectors of size 64.

Figure 5A:
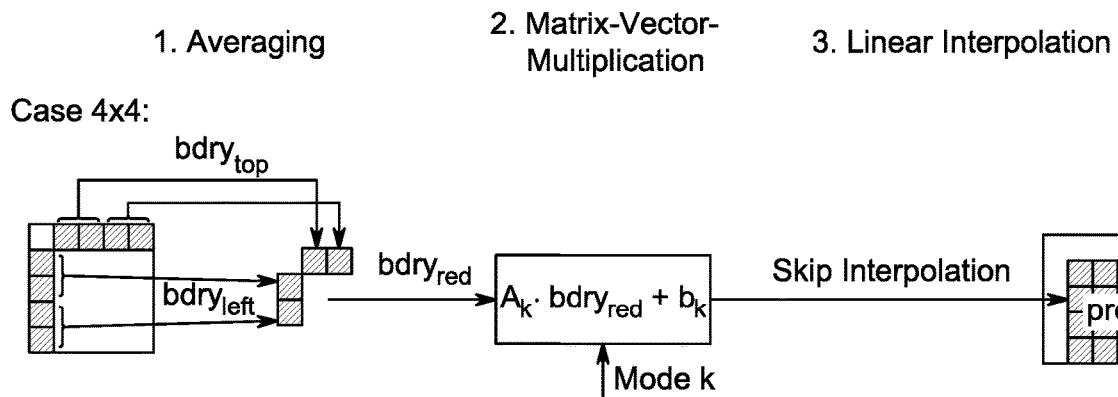
FIG. 5A, 5B, 5C, 5D represent Affine Linear Weighted Intra Prediction (ALWIP), also called Matrix Intra-Prediction (MIP) for various block sizes according to a particular embodiment.

Depending on the mode and the block shape, the vector of input, which is called $bdry_{red}$ for "reduced boundary", is rearranged as follows $$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for max}(W, H) = 8 \text{ and mode} < 10 \\ [bdry_{red}^{left}, bdry_{red}^{top}] & \text{for max}(W, H) = 8 \text{ and mode} \geq 10 \\ [bdry_{red}^{top}, bdry_{red}^{left}] & \text{for max}(W, H) > 8 \text{ and mode} < 6 \\ [bdry_{red}^{left}, bdry_{red}^{top}] & \text{for max}(W, H) > 8 \text{ and mode} \geq 6 \end{cases}$$

where the averaged boundary samples at the top and at the left are denoted $bdry_{red}^{top}$ and $bdry_{red}^{left}$, respectively, as depicted in FIG. 5A.

Then the output reduced set $pred_{red}$ of samples for the predicted blocks is generated as $$pred_{red} = A \cdot bdry_{red} + b.$$

The matrix of weights A and the offset vector b are selected among the sets $S_0, S_1, S_2$ depending on the mode and block shape as $A = A_{idx}^m$ where $$idx(W, H) = \begin{cases} 0 & \text{for } W = H = 4 \\ 1 & \text{for max}(W, H) = 8 \\ 2 & \text{for max}(W, H) > 8 \end{cases}.$$

And $$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for max}(W, H) = 8 \text{ and mode} < 10 \\ \text{mode} - 9 & \text{for max}(W, H) = 8 \text{ and mode} \geq 10 \\ \text{mode} & \text{for max}(W, H) > 8 \text{ and mode} < 6 \\ \text{mode} - 5 & \text{for max}(W, H) > 8 \text{ and mode} \geq 6 \end{cases}.$$

Figure 5B:
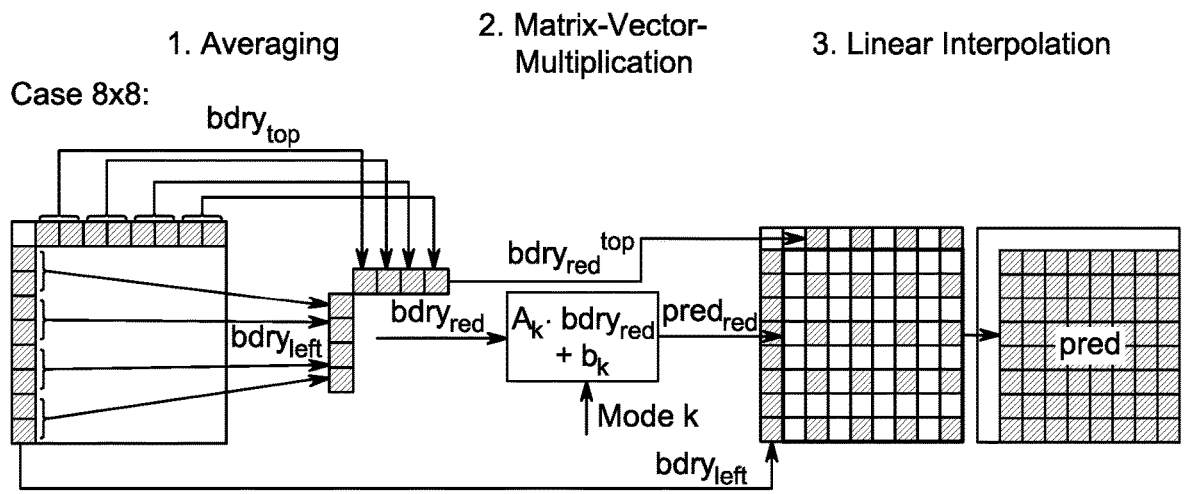
Figure 5C:
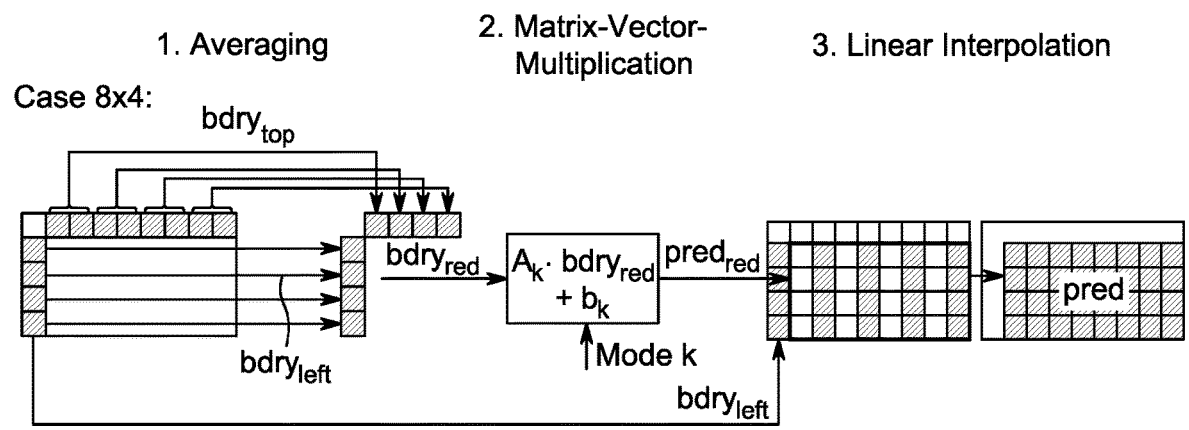

The interpolation processes that are performed on $pred_{red}$, in the case of an 8×8 and 8×4 block, are shown in FIG. 5B and FIG. 5C, respectively.

Figure 5D:
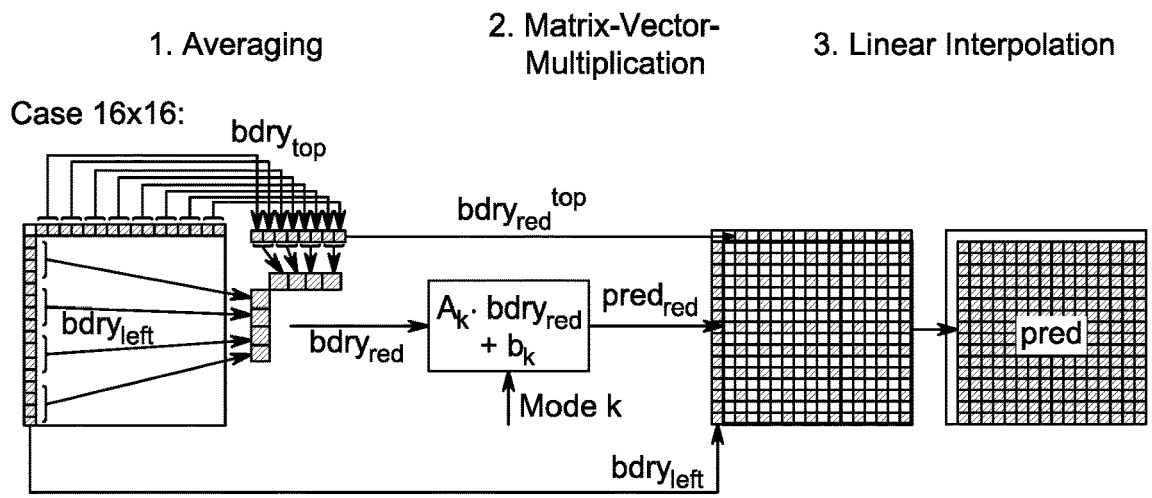

For larger blocks, the reference samples are grouped and averaged so that the input vector is 8 samples long, as shown in for a 16×16 block on FIG. 5D.

This method thus requires storing the sets $S_0, S_1, S_2$ which correspond to 18 matrices of size 16×4 and 18 offsets of size 16

10 matrices of size 16×8 and 10 offsets of size 16

6 matrices of size 64×8 and 6 offsets of size 64, representing 6336 coefficients to be coded, which corresponds to 7.92 kilobytes of data when stored as 10-bit values.

It is thus desirable to reduce the size of the stored matrices as well as to reduce the number of operations per predicted sample to compute.

2 at Least One Embodiment for Encoding or Decoding Using Linear Weighted Intra Prediction A general aspect of at least one embodiment aims to reduce the amount of data needed for affine linear weighted intra prediction (ALWIP), also called matrix based intra prediction (MIP). Advantageously, instead of applying direct matrix multiplication as previously exposed in the section VTM extension of Intra Pred ($pred_{red} = A \cdot bdry_{red} + b$), at least one embodiment proposes a structure of matrices that requires less coefficients and involves less multiplications to derive the intra predicted set of samples, before an optional linear interpolation.

Figure 6:
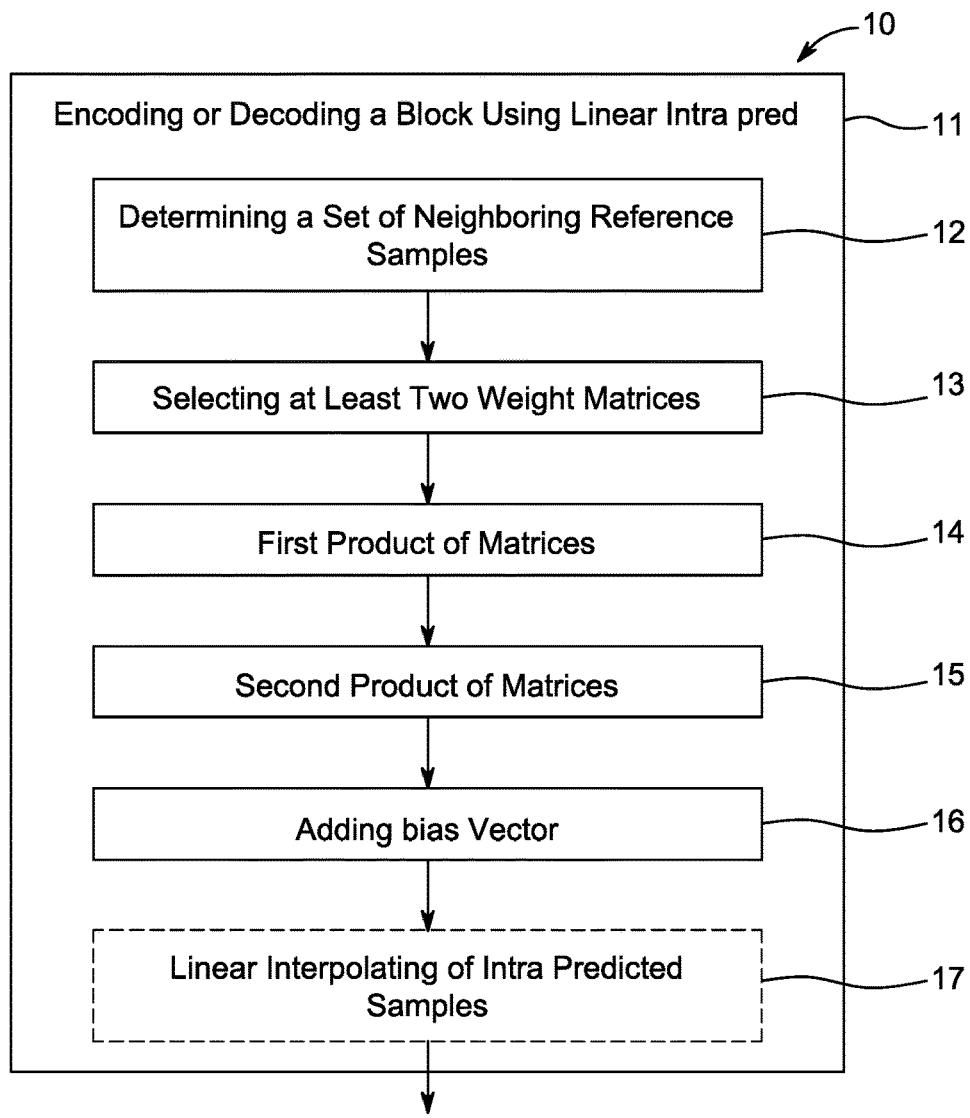
FIG. 6 illustrates an example encoding or decoding method comprising intra prediction according to a general aspect of at least one embodiment.

FIG. 6 illustrates an example of encoding or decoding method comprising obtaining intra predicted samples according to a general aspect of at least one embodiment.

The skilled in the art will appreciate that, once the intra prediction mode is known, the linear weighted intra prediction applies in a same way either at the encoding or decoding. Therefore, the present principles are disclosed for an encoding or a decoding method. It is assumed at this step 11 that a block is being encoded or decoded in intra prediction using linear weighted prediction. The block, typically a CU, belongs to a spatial partition of a picture, typically a CTU in the previous sections. The encoding or decoding method 10 comprises obtaining, for the block being encoded/decoded in intra prediction mode using linear weighted prediction; intra predicted samples for block from at least two products of matrices between at least two selected weight matrices and associated bias among a set of weight matrices and associated bias vectors and a set of neighboring reference samples. The sub-steps of the obtaining of intra predicted samples for block are now detailed. In a step 12, a set of n neighboring reference samples are determined, n is an integer representing the number of reference samples. Advantageously, in a first variant the reference samples are obtained as previously exposed for "reduced boundary" by averaging depending on the block shape (i.e. according to its width and height) and n is either equal to 4 or 8. However, according to a second variant, a block of size width*height, the set of neighboring reference samples x comprises all the reconstructed samples from a neighboring top line of size width and from a neighboring left line of size height. In other words, no down-sampling by averaging of the input samples is applied to the neighboring samples, the number of reference samples is therefore increased compared to the current VVC linear intra prediction. This is affordable because the structure of the matrices according to the present principles involves less multiplications to get the predicted samples. Thus, the complexity of a larger number of reference samples is balanced with the smaller matrix-vector products. Therefore, according to a third variant, the reference samples is even extended to twice the block length or width plus the top-left pixel, as defined for classical angular intra prediction. For a block of size width*height, the set of neighboring reference samples comprises all the reconstructed samples from a neighboring top line of size 2*width and from a neighboring left line of size 2*height in addition to the top-left pixel. In a step 13, at least two weight matrices are selected. The structure of the 2 matrices is described hereafter in the section low rank and low displacement rank. The present principles relate to using at least two weight matrices G and $H^T$ of size m×r and r×n and associated bias vector b among a set of weight matrices and associated bias vectors based on a mode of linear weighted intra prediction and a block shape as previously explained for weighted intra prediction. However, according to the present principles, the first selected weight matrix G has a size m×r and the second selected weight matrix $H^T$ has a size r×n, where m, n, r are integers with r smaller than m and r smaller than n. n being the number of neighboring reference samples of the block previously determined according to any of the variants. m is the reduced number of intra predicted samples obtained from the linear weighted prediction. As previously exposed for linear weighted prediction, a mode k and a block shape allows to select a pair of matrices (G, $H^T$). As shown hereafter, the first and second weight matrices G and $H^T$ are, for instance, obtained from a low rank processing of a weight matrix M among the sets $S_0$, $S_1$, $S_2$. However, the at least one embodiment is not limited to low rank decomposition and any matrix factorizations are compatible with the at least one embodiment. To illustrate the reduction of the number of coefficients, a matrix 16×4 of the set $S_0$ is considered in the following first example. According to prior art, 64 coefficients are stored for the matrix, according to at least one embodiment with r=2, 16×2+2×4=38 coefficients are stored. With a matrix 64×8 of the set $S_2$, using the above calculation, only 288 coefficients are needed for a rank r=4, instead of 512 coefficients. Consequently, the number of operations to obtain the predicted samples is also reduced. In this embodiment deriving the first and second weight matrix from a matrix among the previously disclosed set of matrices, an estimate $\hat{M}$ of the weight matrix M is the product of the first and second weight matrices G and $H^T$, $\hat{M}=GH^T$. However, the present principles are not limited to the obtention of the matrices by processing of disclosed sets of weight matrices. According to an alternative variant, a pair of matrices (G, $H^T$) of size m×r and r×n, are obtained from deep-learning-based training as for disclosed matrices M Thus, an additional constraint being the rank r, defining the shapes of G and $H^T$ is used as additional input for the training stage. According to a first variant, r is determined to reduce the complexity of matrix products. In a first non-limiting example, r is pre-determined in the range [2; min (n,m)]. In another non-limiting example, r is determined responsive to Single Value Decomposition SVD of a weight matrix M among the disclosed set of weight matrices. Then, in a step 14, a first product of matrices $H^Tx$ is processed where x is the set of reference samples, also noted $pred_{red}$ above. Then, in a step 15, a second product of matrices $G(H^Tx)$ is processed. The processing of the multiplications is incorporated within a processor (GPU or CPU) as a combination of hardware and software as known to those skilled in the art. Accordingly, a massive parallel implementation is compatible with the present principles. Then, in a step 16, the bias vector is added and the resulting in $\hat{y}=G(H^Tx)+b$ where $\hat{y}$ is the reduced set of intra predicted samples. In a final optional step 17, in case the number of intra predicted samples is lower than the number of samples in the block, a linear interpolation allows to obtain a linear weighted intra prediction for each sample of the block being coded or decoded.

According to the at least one embodiment, the tradeoff between performance and complexity can be re-balanced. As there can be less parameters to store by considering low rank, their bit depth can be increased, hence improving the performance while keeping a lower number of multiplications. According to yet another variant, the bit depth of the two products of matrices is increased with regard to the bit depth of intra predicted samples, then a clipping is applied (before or after adding the bias). Advantageously, such processing results in a higher precision. According to yet another variant, the bit depth of the coefficients of the two matrices themselves is increased since the number of coefficients to store is decreased.

According to another embodiment, since the number of coefficients is reduced, it possible to adapt the weight matrices at the encoding or decoding. Accordingly, an indication is transmitted in the bitstream to the decoder, so that the decoder applies the same weight matrix process used at the encoder. The matrices, according to at least one embodiment, can be partly or fully transmitted in the bitstream. In a non-limiting example, at least one high level syntax element representative of the set of weight matrices and associated biases is included in the Picture Parameter Set (PPS) to indicate that all the blocks in a frame using linear weighted prediction use the signaled set of weight matrices. In another non-limiting example, at least one high level syntax element representative of said set of weight matrices and associated biases are signaled in the Sequence Parameter Set (SPS) that all blocks in a sequence using linear weighted prediction use the signaled set of weight matrices.

Low Rank

According to a first embodiment, it is possible to optimize the trade-off performance vs. complexity of the mapping by keeping the singular vectors of weights that are more relevant for generating the intra prediction with a Low Rank version of the original structure of the disclosed set of matrices $S_0$, $S_1$, $S_2$.

Low Rank Factorization can be obtained using the well-known Single Value Decomposition (SVD) method which states that for any matrix $M \in \mathbb{R}^{m \times n}$, there exists a singular value decomposition $M = U\Sigma V^T$. U and V can be decomposed as $U=[U_1 \ U_2]$ and $V=[V_1 \ V_2]$, and $\Sigma$ is a diagonal matrix containing the real non negative singular values of A in decreasing order. Hence, $\Sigma$ can be decomposed as $$\Sigma = \begin{bmatrix} \sum_1 & 0 \\ 0 & \sum_2 \end{bmatrix}.$$

$U_1$, $V_1^T$ and $\Sigma_1$ are of size m×r, r×n and r×r, respectively.
r is a parameter of choice. If it is equal to the actual rank of A there is equality, else, the resulting operator $\hat{M}$ consist in an approximation of M.

A common way of storing $\hat{M}$ can also be written as $\hat{M} = GH^T$, where G and $H^T$, of size m×r and r×n, correspond to the multiplication of $U_1$, $V_1^T$ by the square root of the diagonal values of $\Sigma_1$.

Considering the case described in FIG. 5D, where the tool first generates a set of 64 samples out of 8 input samples. There are 8×64=512 coefficients involved. Applied to an input vector of size 8×1 in this case, the corresponding process requires 512 multiplications. Generally, the complexity of a matrix-vector multiplication of size m×n is O(mn).

Let consider an approximation of rank 4, then G and $H^T$ are of size 64×4 and 4×8, which results in 256+32=288 parameters. Applied to an input vector of size 8, the corresponding process requires 8×4=32 and 4×64=256 multiplications for computing $H^T x$ and $G(H^T x)$, respectively. Hence a total of 256+32=288 multiplications are required, instead of 512. Generally, the complexity of the product for a rank r is reduced to O((m+n)r).

In the current VVC weighted intra prediction, the number of both input and output samples was reduced to satisfy complexity criteria. Both reductions can be considered as handcrafted, since they down-sample the input reference samples by averaging them, and compute a subset of predicted samples, which are interpolated to produce the final prediction block. The proposed structure enables training a structure of weights which optimizes the use of all the reference samples, while ensuring a reasonable number of weights, hence less operations.

Besides, as for the existing method, the range of predicted pixels needs to fit the range of the pixels of the video, for example (0, 1023) in the case of a 10-bit output video. This should be handled either by normalization of the weights and biases to ensure it or clipping of the output signal.

Low Displacement Rank

Alternatively, according to a second embodiment, the matrices of weights can be approximated by Low Displacement Rank matrices (LDR). The LDR representation will contain less weights to store and load in memory, some will enable to perform inference of the weight matrices on decoder with very limited resources.

The computation of LDR matrices is described in «*Inversion of displacement operators*», by Pan, Victor Y. et Xinmao Wang, (*SIAM Journal on Matrix Analysis and Applications*, vol. 24.3, p. 660-677, 2003) Suppose a matrix M has low rank $r_k \ll \min\{m, n\}$, then it implies that $$L_{A,B}(M) = M - AMB = GH^T,$$

where A,B are square matrices of size m×m, n×n respectively, G is a m×r matrix, H is n×r matrix, and m, n are the number of rows and columns of the original weight matrix M. Here, the displacement r is a parameter of choice. As for the case of Low Rank approximations, a small r implies more compression and computational efficiency.

It is demonstrated by Pan, Victor Y. et al. that, using the above equation can be expressed as:

$$\hat{M} = \sum_{j=1}^{r} Z_{e,m,m}(g_j) z_{f,n,m}(Jh_j)^T J(I_n - eZ_f^m)^{-1}$$

where r is the chosen displacement rank parameter, $$Z_f = \begin{pmatrix} & f \\ I_{n-1} & \end{pmatrix}$$

is the f-circulant matrix, $g_j$ and $h_j$ are the r vectors of the above G and H. The operator $Z_{f,n,m}$ is defined as follows: for a vector $$v = (v_1, \ldots, v_m)^T, Z_{f,n,m}(v) = (z_{i,j})_{\substack{1 \le i < m \\ 1 \le j < n}}, \text{ with}$$

$$z_{i,j} = \begin{cases} v_{i-j+1} & \text{if } i \ge j \\ f^k v_{m-l} & \text{if } j - i - 1 = km + l, 0 \le l \le m - 1, k \ge 0 \end{cases}$$

$J_n$ denotes the n×n reflection matrix, i.e., all the anti-diagonal entries are 1 as follows:

$$J_n = \begin{bmatrix} 0 & \cdots & 1 \\ \vdots & \ddots & \vdots \\ 1 & \cdots & 0 \end{bmatrix}.$$

Using LDR approximations are especially advantageous when dealing with large matrices, since the matrix multiplications can be replaced by Fast Fourier Transform operations, due to the structure of the chosen operators, as demonstrated by Pan, Victor Y. et all.

This can come in handy when extending the current tool to bigger initial matrices.

3 Additional Embodiments and Information

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 7:
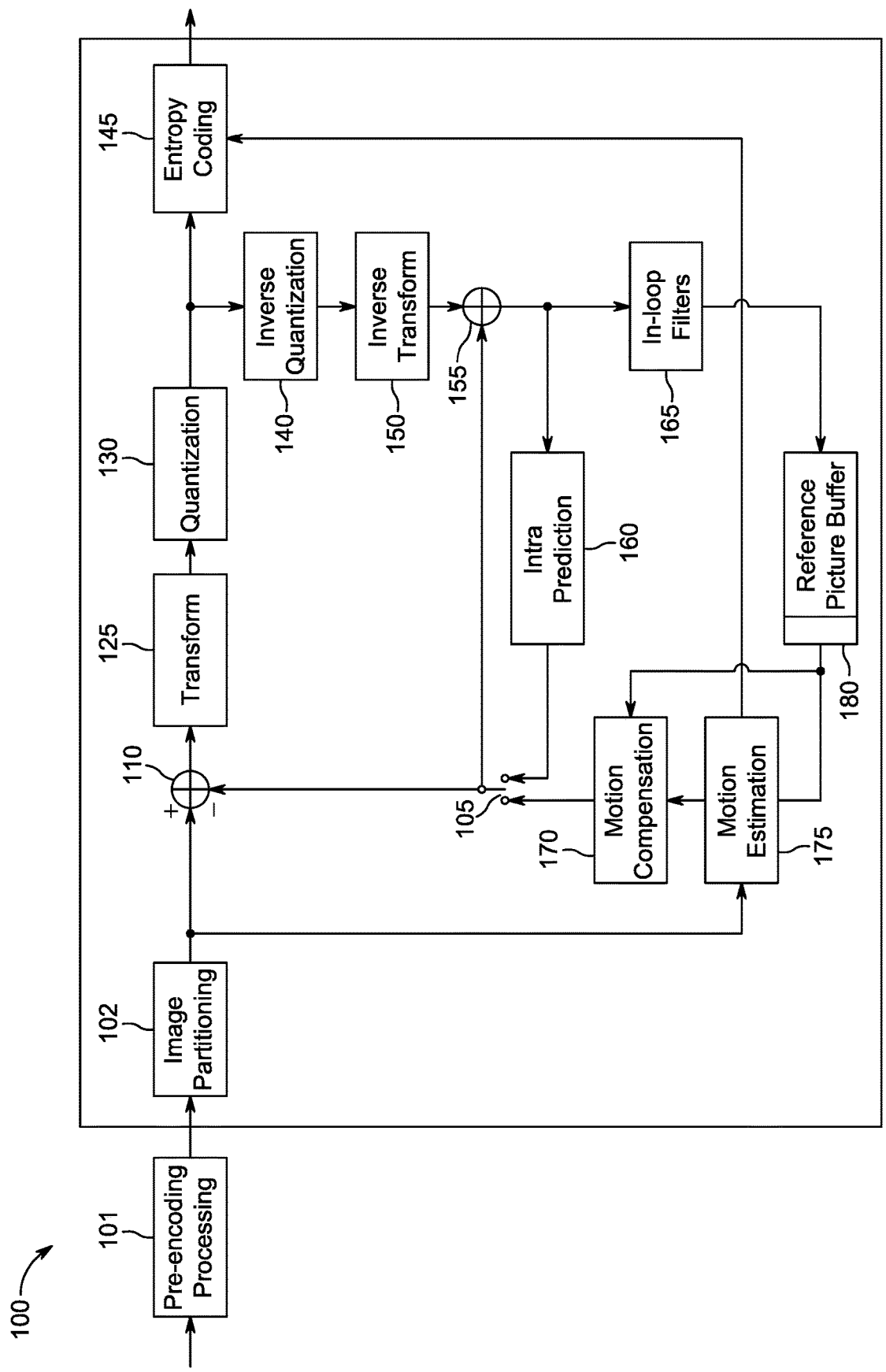
FIG. 7 illustrates a block diagram of an embodiment of video encoder in which various aspects of the embodiments may be implemented.
Figure 8:
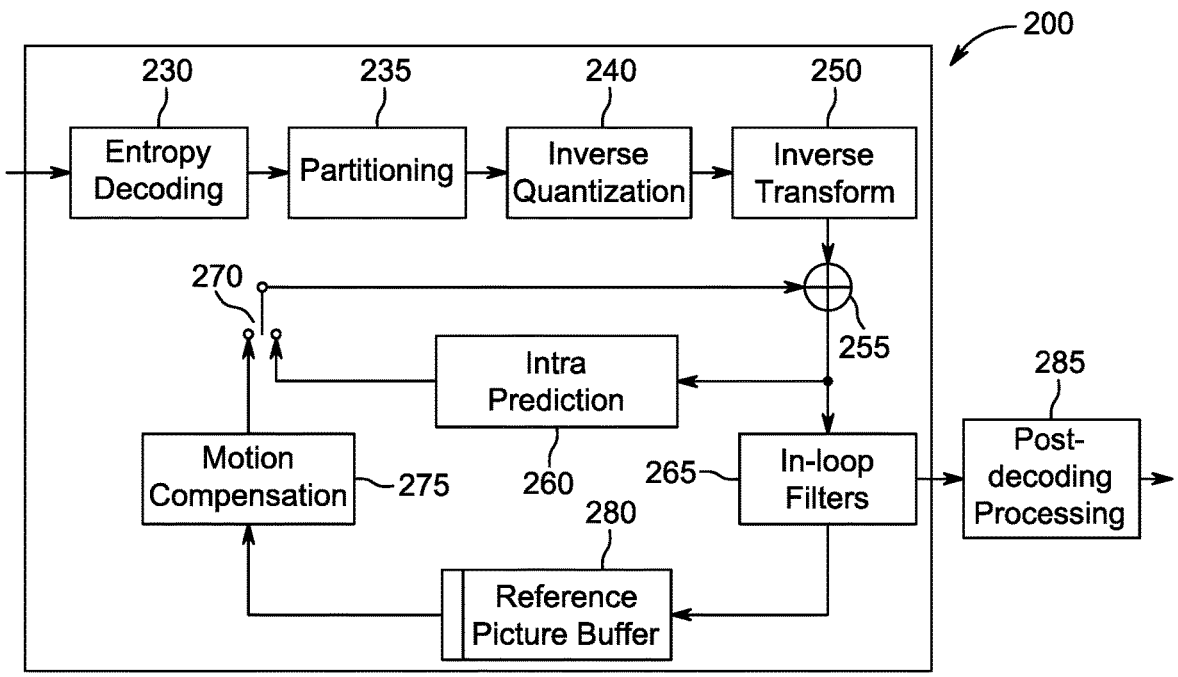
FIG. 8 illustrates a block diagram of an embodiment of video encoder in which various aspects of the embodiments may be implemented.
Figure 9:
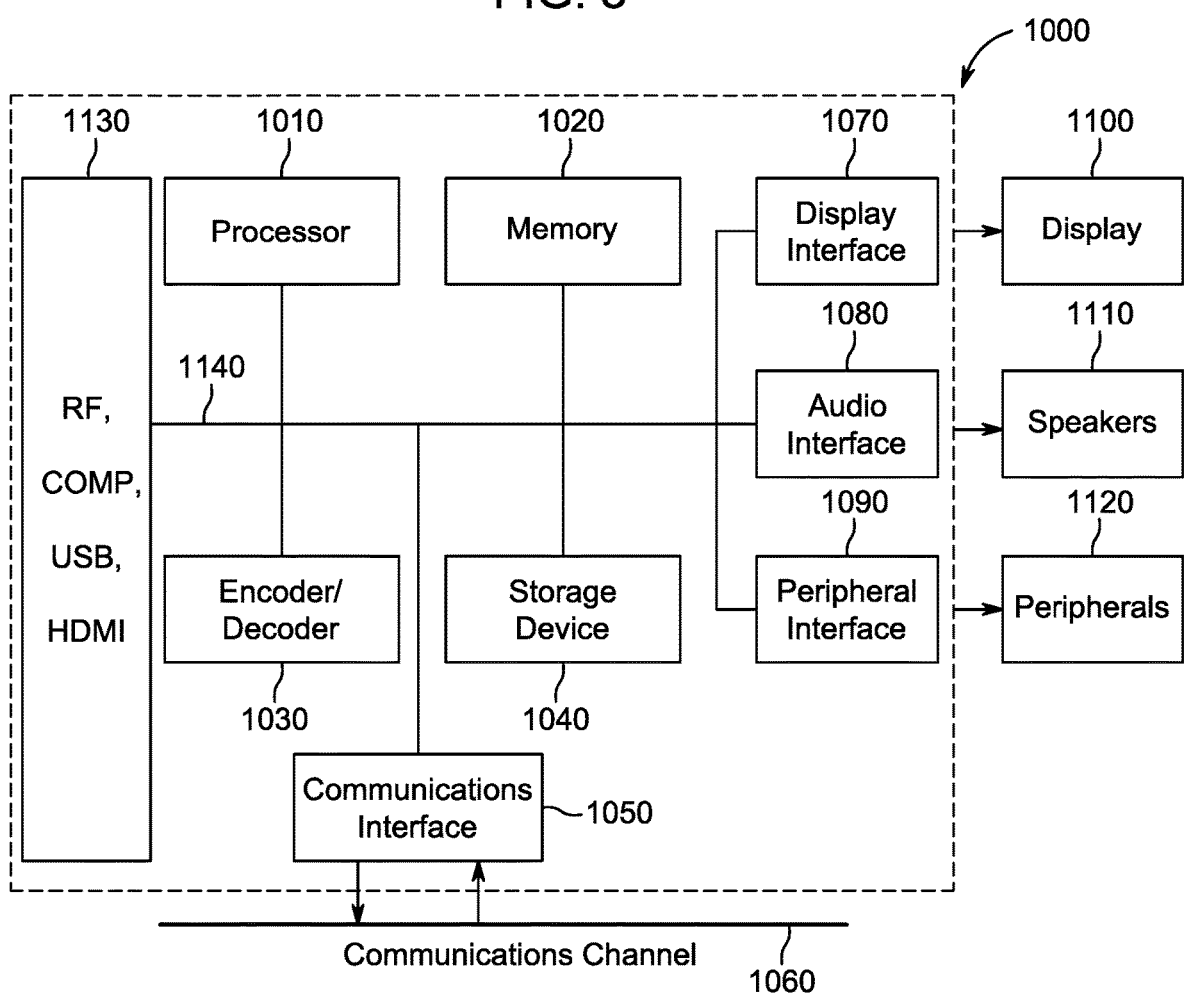
FIG. 9 illustrates a block diagram of an example apparatus in which various aspects of the embodiments may be implemented.

The aspects described and contemplated in this application can be implemented in many different forms. FIGS. 7, 8 and 9 below provide some embodiments, but other embodiments are contemplated and the discussion of FIGS.

7, 8 and 9 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction module (160, 260) of a video encoder 100 and decoder 200 as shown in FIG. 7 and FIG. 8. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example. The specific values are for example purposes and the aspects described are not limited to these specific values.

FIG. 7 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 8 illustrates a block diagram of a video decoder 200. In the decoder 200, a bitstream is decoded by the decoder elements as described below. Video decoder 200 generally performs a decoding pass reciprocal to the encoding pass as described in FIG. 7. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 9 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 9, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, matrix based intra prediction using at least two products of matrices of reduced size for memory footprint reduction.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, matrix based intra prediction using at least two products of matrices of reduced size.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for matrix based intra prediction. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Modifying an encoding/decoding of a block of a picture of a video, the block being coded/decoded in intra prediction mode using linear weighted prediction for reducing the memory used to store the weight matrices;

Obtaining intra predicted samples of a block from at least two products of matrices between at least two selected weight matrices and associated bias among a set of weight matrices and associated bias vectors and a set of neighboring reference samples;

Selecting at least two weight matrices G and $H^T$ of size m×r and r×n and associated bias vector b among a set of weight matrices and associated bias vectors based on a mode of linear weighted intra prediction and a block shape, the first selected weight matrix G having a size m×r and the second selected weight matrix G having a size r×n, where m, n, r are integers with r smaller than m and r smaller than n;

Obtaining intra predicted samples y of a block from a first product of matrices $H^T x$, a second product of matrices $G(H^T x)$ and adding associated bias b resulting in $y = G(H^T x) + b$ where x is a set of n neighboring reference samples;

A first and a second weight matrix G and $H^T$ are obtained from low rank processing of a weight matrix M of size m×n and wherein an estimate $\hat{M}$ of said weight matrix M is the product of the first and second weight matrices G and $H^T$, $\hat{M} = GH^T$;

The rank r is determined to reduce matrices product complexity;

The rank r is determined responsive to Single Value Decomposition of the weight matrix M, For a block of size width*height, the set of neighboring reference samples x comprises all the reconstructed samples from a neighboring top line of size width and from a neighboring left line of size height thus avoiding down-sampling of reference samples;

For a block of size width*height, the set of neighboring reference samples x comprises all the reconstructed samples from a neighboring top line of size 2*width and from a neighboring left line of size 2*height as for classical intra prediction;

Storing the disclosed structured matrices used for matrix based intra prediction;

Deriving the intra predicted samples of a block to encode or decode from stored structured matrices.

Increasing the bit depth of the two products of matrices with regard to the bit depth of intra predicted samples;

Increasing the bit depth of the matrices with regard to the bit depth of intra predicted samples;

Enabling or disabling the processing of structured weight matrices used in matrix based intra prediction methods in the decoder and/or encoder;

Inserting in the signalling syntax elements that enable the decoder to identify the possible weight matrices used in matrix based intra prediction methods in the decoder and/or encoder;

Inserting in the signaling, at least one high level syntax element representative of the set of weight matrix and associated bias, in the Picture Parameter Set (PPS) so that all blocks in a frame using linear weighted prediction uses the signaled set of weight matrices;

Inserting in the signaling, at least one high level syntax element representative of the set of weight matrix and associated bias, in the Sequence Parameter Set (SPS) so that all blocks in a sequence using linear weighted prediction uses the signaled set of weight matrices;

A bitstream or signal that includes one or more of the described syntax elements, or variations thereof.

A bitstream or signal that includes syntax conveying information generated according to any of the embodiments described.

Inserting in the signaling syntax elements that enable the decoder to apply matrix based intra prediction in a manner corresponding to that used by an encoder.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs matrix based intra prediction according to any of the embodiments described.

A TV, set-top box, cell phone, tablet, or other electronic device that performs matrix based intra prediction according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs matrix based intra prediction according to any of the embodiments described.

A TV, set-top box, cell phone, tablet, or other electronic device that receives (e.g. using an antenna) a signal over the air that includes an encoded image, and performs matrix based intra prediction according to any of the embodiments described.

The invention claimed is:

1. A method comprising:
encoding a block of a picture of a video in intra prediction mode using linear weighted prediction,
wherein the encoding comprises:
determining a set of n neighboring reference samples x;
selecting at least a first weight matrix G of size m×r, a second weight matrix $H^T$ of size r×n, and an associated bias vector b among a set of weight matrices and associated bias vectors based on a mode of linear weighted intra prediction and a block shape, the first weight matrix G having a size m×r and the second weight matrix $H^T$ having a size r×n, where m, n, r are integers with r smaller than m and r smaller than n; and
obtaining intra predicted samples $\hat{y}$ of the block from a first product of matrices $H^T x$, a second product of matrices $G(H^T x)$, and adding associated bias b resulting in $\hat{y} = G(H^T x) + b$.

2. The method of claim 1, wherein the first and second weight matrices G and $H^T$ are obtained from low rank processing of a weight matrix M of size m×n and wherein an estimate M of the weight matrix M is the product of the first and second weight matrices G and $H^T$, $\hat{M} = GH^T$.

3. The method of claim 1, wherein r is determined to reduce matrices product complexity.

4. The method of claim 1, wherein r is determined responsive to Single Value Decomposition SVD of the weight matrix M.

5. The method of claim 1, wherein, for a block of size width*height, the set of neighboring reference samples x comprises all reconstructed samples from a neighboring top line of size width and from a neighboring left line of size height.

6. The method of claim 1, wherein for a block of size width*height, the set of neighboring reference samples x comprises all reconstructed samples from a neighboring top line of size 2*width and from a neighboring left line of size 2*height.

7. The method of claim 1, wherein at least one high level syntax element representative of the set of weight matrix and associated bias are signaled in a Picture Parameter Set (PPS) so that all blocks in a frame using linear weighted prediction uses the signaled set of weight matrices.

8. The method of claim 1, wherein at least one high level syntax element representative of the set of weight matrix and associated bias are signaled in a Sequence Parameter Set (SPS) so that all blocks in a sequence using linear weighted prediction uses the signaled set of weight matrices.

9. The method of claim 1, wherein a bit depth of the first product of matrices and of the second product of matrices is increased with regard to a bit depth of intra predicted samples.

10. A method comprising:
   decoding a block of a picture of a video, the block being coded in intra prediction mode using linear weighted prediction,
   wherein the decoding comprises:
   determining a set of n neighboring reference samples x;
   selecting at least a first weight matrix G of size m×r, a second weight matrix $H^T$ of size r×n, and an associated bias vector b among a set of weight matrices and associated bias vectors based on a mode of linear weighted intra prediction and a block shape, the first weight matrix G having a size m×r and the second weight matrix $H^T$ having a size r×n, where m, n, r are integers with r smaller than m and r smaller than n; and
   obtaining intra predicted samples ŷ of the block from a first product of matrices $H^T x$, a second product of matrices $G(H^T x)$, and adding associated bias b resulting in $ŷ = G(H^T x) + b$.

11. The method of claim 10, wherein the first and second weight matrices G and $H^T$ are obtained from low rank processing of a weight matrix M of size m×n, and wherein an estimate $\hat{M}$ of the weight matrix M is the product of the first and second weight matrices G and $H^T$, $\hat{M} = GH^T$.

12. The method of claim 10, wherein r is determined to reduce matrices product complexity.

13. The method of claim 10, wherein r is determined responsive to Single Value Decomposition SVD of the weight matrix M.

14. The method of claim 10, wherein, for a block of size width*height, the set of neighboring reference samples x comprises all reconstructed samples from a neighboring top line of size width and from a neighboring left line of size height.

15. The method of claim 10, wherein for a block of size width*height, the set of neighboring reference samples x comprises all reconstructed samples from a neighboring top line of size 2*width and from a neighboring left line of size 2*height.

16. The method of claim 10, wherein at least one high level syntax element representative of the set of weight matrix and associated bias are signaled in a Picture Parameter Set (PPS) so that all blocks in a frame using linear weighted prediction uses the signaled set of weight matrices.

17. The method of claim 10, wherein at least one high level syntax element representative of the set of weight matrix and associated bias are signaled in a Sequence Parameter Set (SPS) so that all blocks in a sequence using linear weighted prediction uses the signaled set of weight matrices.

18. The method of claim 10, wherein a bit depth of the first product of matrices and of the second product of matrices is increased with regard to a bit depth of intra predicted samples.

19. An apparatus comprising one or more processors, and at least one memory, the one or more processors configured for:
   encoding a block of a picture of a video in intra prediction mode using linear weighted prediction,
   wherein intra predicted samples of the block are obtained by:
   determining a set of n neighboring reference samples x;
   selecting at least a first weight matrix G of size m×r, a second weight matrix $H^T$ of size r×n, and an associated bias vector b among a set of weight matrices and associated bias vectors based on a mode of linear weighted intra prediction and a block shape, the first weight matrix G having a size m×r and the second weight matrix $H^T$ having a size r×n, where m, n, r are integers with r smaller than m and r smaller than n; and
   obtaining intra predicted samples ŷ of the block from a first product of matrices $H^T x$, a second product of matrices $G(H^T x)$, and adding associated bias b resulting in $ŷ = G(H^T x) + b$.

20. An apparatus comprising one or more processors, and at least one memory, the one or more processors configured for:
   decoding a block of a picture of a video, the block being coded in intra prediction mode using linear weighted prediction,
   wherein intra predicted samples of the block are obtained by:
   determining a set of n neighboring reference samples x;
   selecting at least a first weight matrix G of size m×r, a second weight matrix $H^T$ of size r×n, and an associated bias vector b among a set of weight matrices and associated bias vectors based on a mode of linear weighted intra prediction and a block shape, the first weight matrix G having a size m×r and the second weight matrix $H^T$ having a size r×n, where m, n, r are integers with r smaller than m and r smaller than n; and
   obtaining intra predicted samples ŷ of the block from a first product of matrices $H^T x$, a second product of matrices $G(H^T x)$, and adding associated bias b resulting in $ŷ = G(H^T x) + b$.

21. A non-transitory computer readable medium having stored instructions which, when executed by one or more processors, cause the one or more processors to perform the method of claim 1.

22. A non-transitory computer readable medium having stored instructions which, when executed by one or more processors, cause the one or more processors to perform the method of claim 10.

* * * * *